United States Patent [19]

Freitag et al.

[11] Patent Number: 5,310,793
[45] Date of Patent: May 10, 1994

[54] MIXTURES OF POLYALKYLENE TEREPHTHALATES, NEW POLYCARBONATES AND/OR POLYESTER-CARBONATES AND ELASTOMERS

[75] Inventors: Dieter Freitag; Karsten-Josef Idel; Gerd Fengler, all of Krefeld; Ulrich Grigo, Kempen; Jürgen Kirsch, Cologne; Uwe Westeppe, Mettmann, all of Fed. Rep. of Germany

[73] Assignee: Bayer Aktiengesellschaft, Leverkusen, Fed. Rep. of Germany

[21] Appl. No.: 17,226

[22] Filed: Feb. 12, 1993

Related U.S. Application Data

[63] Continuation of Ser. No. 472,536, Jan. 30, 1990, abandoned.

[30] Foreign Application Priority Data

Feb. 2, 1989 [DE] Fed. Rep. of Germany ..... 39031020

[51] Int. Cl.$^5$ .................. C08L 67/02; C08L 67/03
[52] U.S. Cl. ........................................ 525/67; 525/92; 525/101; 525/133; 525/147; 525/439
[58] Field of Search ................. 525/67, 92, 147, 133

[56] References Cited

U.S. PATENT DOCUMENTS

| | | | |
|---|---|---|---|
| 3,872,598 | 3/1975 | Bachner et al. | 33/169 R |
| 4,013,613 | 3/1977 | Abolins et al. | 260/40 R |
| 4,368,315 | 1/1983 | Sikdar | 528/198 |
| 4,380,612 | 4/1983 | Mark | 525/439 |
| 4,554,309 | 11/1985 | Mark | 524/611 |
| 4,629,760 | 12/1986 | Liu | 525/67 |
| 4,656,227 | 4/1987 | Lindner et al. | 525/133 |
| 4,866,123 | 9/1989 | Wittman | 525/67 |
| 4,945,130 | 7/1990 | Genz et al. | 525/67 |

FOREIGN PATENT DOCUMENTS

| | | |
|---|---|---|
| 019126 | 11/1980 | European Pat. Off. . |
| 019127 | 11/1980 | European Pat. Off. . |
| 105388 | 4/1984 | European Pat. Off. . |
| 164477 | 12/1985 | European Pat. Off. . |

Primary Examiner—Patricia A. Short
Attorney, Agent, or Firm—Joseph C. Gil; Aron Preis; Richard E. L. Henderson

[57] ABSTRACT

The mixtures according to the present invention of polyalkylene terephthalates, certain new polycarbonates and/or polyester-carbonates and elastomers have a particularly favourable low temperature strength/heat distortion point relationship compared with conventional moulding compositions containing known polycarbonates. The mixtures are used for the production of, in particular, shaped articles.

3 Claims, No Drawings

MIXTURES OF POLYALKYLENE TEREPHTHALATES, NEW POLYCARBONATES AND/OR POLYESTER-CARBONATES AND ELASTOMERS

This application is a continuation of application Ser. No. 07/472,536 filed Jan. 30, 1990, now abandoned.

This invention relates to mixtures of polyalkylene terephthalates, certain new polycarbonates and/or polyester-carbonates and elastomers and to the use of such mixtures for the production of shaped articles.

Mixtures of polyalkylene terephthalates, polycarbonates and rubber-elastic polymers are known (see e.g. DE-2,243,609, DE-2,248,242 and EP-105 388). These mixtures have many positive properties, but some requirements are not met. In particular, an improvement in the low impact strength at low temperature and at the same time in the heat distortion point and the processing properties, especially the flow properties, is desirable.

It has now been found that, when certain new polycarbonates and/or polyester-carbonates are used, mixtures having good low temperature strengths and heat distortion points in combination with excellent flowability are obtained.

The present invention thus relates to mixtures comprising:
- (A) from 0.1 to 99.7 wt. %, preferably from 10 to 90 wt. %, more preferably from 20 to 80 wt. %, of polyalkylene terephthalates;
- (B) from 0.1 to 99.7 wt. %, preferably from 1 to 90 wt. %, more preferably from 1 to 50 wt. %, of thermoplastic aromatic polycarbonates (B1) and/or polyester-carbonates (B2) based on diphenols corresponding to the following general formula:

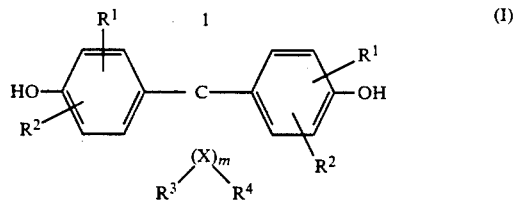

wherein
$R^1$ and $R^2$ independently represent hydrogen, halogen, preferably chlorine or bromine, $C_1$-$C_8$alkyl, preferably methyl, ethyl or propyl, $C_5$ or $C_6$cycloalkyl, preferably cyclohexyl, $C_6$-$C_{10}$aryl, preferably phenyl, and $C_7$-$C_{12}$aralkyl, preferably phenyl-$C_1$-$C_4$-alkyl, in particular benzyl;
m represents an integer of from 4 to 7, preferably 4 or 5;
$R^3$ and $R^4$ may be selected individually for each X and independently represent hydrogen or $C_1$-$C_6$alkyl, preferably methyl; and
X represents carbon; provided that, on at least one ring carbon atom, $R^3$ and $R^4$ both represent $C_1$-$C_6$alkyl; and
- (C) from 0.1 to 99.7 wt. %, preferably from 1 to 50 wt. %, more preferably from 1 to 30 wt. %, of elastomers; with the proviso that (A) to (C) total 100 wt. %.

Polyalkylene terephthalates (A) in the context of the present invention are reaction products of aromatic dicarboxylic acids and reactive derivatives thereof (e.g. dimethyl esters or anhydrides) and aliphatic, cycloaliphatic or araliphatic diols and mixtures these reaction products.

Preferred polyalkylene terephthalates may be obtained from terephthalic acid (or reactive derivatives thereof) and aliphatic or cycloaliphatic diols having from 2 to 10 carbon atoms by known methods (Kunststoff-Handbuch, vol. VIII; pages 695 et seq., Carl Hanser Verlag, Munich 1973).

The preferred polyalkylene terephthalates contain at least 80, preferably at least 90, mol %, based on the dicarboxylic acid component, of terephthalic acid radicals and at least 80, preferably at least 90, mol %, based on the diol component, of ethylene glycol and/or butane-1,4-diol and/or cyclohexane-1,4-dimethanol radicals.

In addition to the terephthalic acid radicals, the polyalkylene terephthalates may contain up to 20 mol % of radicals of other aromatic dicarboxylic acids having from 8 to 14 carbon atoms or aliphatic dicarboxylic acids having from 4 to 12 carbon atoms, such as radicals of phthalic acid, isophthalic acid, naphthalene-2,6-dicarboxylic acid, 4,4'-diphenyldicarboxylic acid, succinic, adipic or sebacib, acid, azelaic acid and/or cyclohexane diacetic acid.

The polyalkylene terephthalates may also contain up to 20 mol % of other aliphatic diols having from 3 to 12 carbon atoms or cycloaliphatic diols having from 6 to 21 carbon atoms, e.g. radicals of propane-1,3-diol, 2-ethylpropane-1,3-diol, neopentylglycol, pentane-1,5-diol, hexane-1,6-diol, cyclohexane-1,4-dimethanol, 3-methylpentane-2,4-diol, 2-methylpentane-2,4-diol, 2,2,4-trimethyl-pentane-1,3-diol and -1,6-diol, 2-ethylhexane-1,3-diol, 2,2-diethylpropane-1,3-diol, hexane-2,5-diol, 1,4-di-($\beta$-hydroxyethoxy)-benzene, 2,2-bis-(4-hydroxycyclohexyl)-propane, 2,4-dihydroxy-1,1,3,3-tetramethyl-cyclobutane, 2,2-bis-(3-$\beta$-hydroxyethoxyphenyl)-propane and/or 2,2-bis-(4-hydroxypropoxyphenyl)-propane (DE-OS 24 07 674; 24 07 76 and 27 15 932).

The polyalkylene terephthalates may be branched by incorporation of relatively small amounts of tri- or tetra-hydric alcohols or tri- or tetra-basic carboxylic acids, such as are described, e.g. , in DE-OS 19 00 270 and U.S. Pat. No. 3,692,744. Examples of preferred branching agents are trimesic acid, trimellitic acid, trimethylolethane and -propane and/or pentaerythritol.

Not more than 1 mol % of the branching agent, based on the acid component, is usually employed.

Polyalkylene terephthalates which consist solely of terephthalic acid or reactive derivatives thereof, e.g. dialkyl esters thereof, and ethylene glycol and/or butane 1,4-diol and/or cyclohexane-1,4-dimethanol are especially preferred.

The polyalkylene terephthalates preferably employed as component (A) in general have an intrinsic viscosity of from about 0.4 to 1.5 dl/g, preferably from 0.5 to 1.3 dl/g, more preferably from 0.6 to 1.2 dl/g, in each case measured in phenol/o-dichlorobenzane (1:1 parts, by weight) at 25° C.

Polycarbonates (B1) and/or polyester-carbonates (B2) based on dihydroxydiphenylcycloalkans (I) which 1 or 2 ring carbon atoms are (is) simultaneously substituted by alkyl radicals and wherein the alkyl-disubstituted ring carbon atom(s) is (are) in the $\beta$-position relative to the carbon atom $C^1$, are preferably employed as component (B).

Substitution of a carbon atom in the β-position relative to the C-1 ring carbon atom by 2 alkyl radicals and simultaneous substitution of a carbon atom in the β'-position by an alkyl radical is particularly preferred.

Preferred dihydroxydiphenylcycloalkanes having 5 or 6 ring carbon atoms in the cycloaliphatic radical (m=4 or 5 in (I)) are, in for example, the diphenols corresponding to the following general formulae:

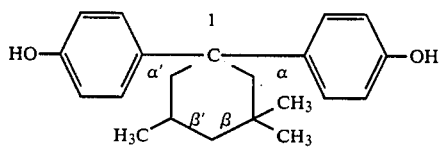 (II)

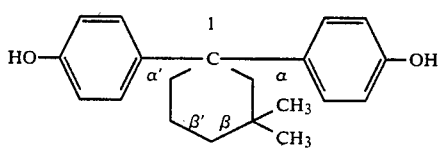 (III)

and

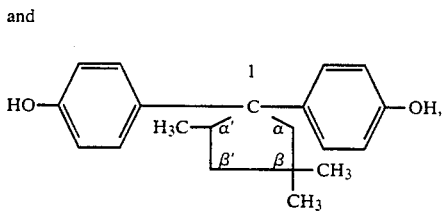 (IV)

1,1-bis-(4-hydroxyphenyl)-3,3,5-trimethylcyclohexane (II) being especially preferred.

The dihydroxydiphenylcycloalkanes (I) may be obtained in known manner by condensation of phenols corresponding to the following general formula (V):

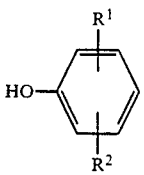 (V)

with ketones corresponding to the following general formula (VI):

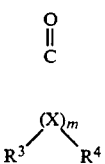 (VI)

wherein, X, $R^1$, $R^2$, $R^3$, $R^4$ and m are as defined in connection with (I).

The condensation is general by carried out in the presence of acid catalysts. The temperatures are general by from about −30° to 300° C., preferably from −15° to 150° C., and the pressures are from about 1 to 20 bar, preferably from 1 to 10 bar. To prepare the bisphenols (I), from about 2 to 10 mol, preferably from 2.5 to 6 mol, of phenol (V) are usually employed per mol of ketone (VI). In addition to the acid catalysts, co-catalysts may also be employed for the condensation. Further details of the preparation of the bisphenols (I) are to be found in German Patent Application P 38 32 396 and German Patent Application P 38 33 953.6.

To prepare the polycarbonates (B1) and/or polyestercarbonates (B2) to be employed as component (B), the diphenols (I) may also be employed as a mixture with other diphenols, for example with those corresponding to the following general formula:

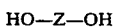

HO—Z—OH (VII), other diphenols (VII) which are suitable are those which Z represents a mono- or polynuclear optionally substituted aromatic radical having from 6 to 30 carbon atoms. The polynuclear aromatic radicals may be interrupted by one or more bridge members, such as heteroatoms (S, O or N), alkylidene radicals having from 1 to 6 carbon atoms and cycloalkylidene radicals having from 5 to 7 carbon atoms, with the exception of the cycloalkylidene radicals mentioned in connection with (I). Examples of possible diphenols (VII) are resorcinol, dihydroxydiphenyls, bis-(hydroxyphenyl)-alkanes, bis-(hydroxy-phenyl) -cycloalkanes, bis-(hydroxyphenyl) sulphides, bis-(hydroxyphenyl) ethers, bis-(hydroxyphenyl) ketones, bis-(hydroxyphenyl) sulphones, bis-(hydroxyphenyl) sulphoxide, α,α'-bis-(hydroxyphenyl)-diisopropylbenzenes and nuclear-alkylated and -halogenated compounds thereof, as well as polydiorganosiloxanes containing α,ω-bishydroxyaryloxy end groups and having a degree of polymerization $P_n$ of 5 to 100.

These and other further diphenols which are suitable are described e.g. in U.S. Pat. Nos. 3,419,634; 3,028,365; 2,999,835; 3,148,172; 3,275,601; 2,991,273; 3,271,367; 3,062,781; 2,970,131 and 2,999,846, in German Offenlegungsschrift Nos. 1,570,703; 2,063,050; 2,063,052 and 2,211,056, in French Patent No. 1,561,518 and in the monograph "H. Schnell, Chemistry and Physics of Polycarbonates, Interscience Publishers, New York 1964".

Examples of particularly preferred diphenols (VII) are:
2,2-bis-(4-hydroxyphenyl)-propane,
2,2-bis-(3,5-dimethyl-4-hydroxyphenyl)-propane,
2,2-bis-(3,5-dichloro-4-hydroxyphenyl)-propane,
2,2-bis-(3,5-dibromo-4-hydroxyphenyl)-propane and
1,1-bis-(4-hydroxyphenyl)-cyclohexane, 2,2-bis-(4-hydroxyphenyl)-propane is particularly preferred.

The diphenols may be employed either individually or as mixtures.

The diphenols (I) and the other known diphenols (VII) mentioned, may be employed in a molar ratio with respect to one another which is from 100(I):0(VII) to 1(I):99(VII) preferably from 100(I):0(VII) to 10(I):90(VII) , more preferably from 100(I):0(VII) to 20(I):80(VII).

Polycarbonates which also contain known diphenols in addition to the new diphenols (I) and are to be employed as component (B1) may also be obtained by first preparing polycarbonates based exclusively on the new diphenols and then mixing polycarbonates based exclusively on the known diphenols and these polycarbonates with one another so that a ratio of new diphenols to known diphenols which corresponds to the ratios of the diphenols relative to one another described above is obtained in the polycarbonate.

The polycarbonates to be employed may be branched in a known manner. If branching is desired, it may be achieved in a known manner by co-condensation of small amounts, preferably amounts of from about 0.05 to 2.0 mol %, based on the diphenols employed, of compounds which are at best trifunctional, in particular those having 3 or more phenolic hydroxyl groups. The branching agents are known and are described, for example in, Encyclopedia of Polymer Science and Engineering, p. 660, volume 11, John Wiley, New York, 1988.

The polycarbonates to be employed as component (B1) may be prepared by various known processes. Examples which are mentioned are the phase interface process and the process in homogeneous solution, the so-called "pyridine process" and the melt transesterification process (c.f. H. Schnell, "Chemistry and Physics of Polycarbonates", Polymer Reviews, vol. IX, pages 33 et seq., Interscience Publ., 1964). The polycarbonates are preferably prepared by the phase interface process.

The polycarbonates (B1) generally have molecular weights Mw (weight-average, determined by gel chromatography after prior calibration) which are from 10,000 to 200,000, preferably from 20,000 to 80,000.

Examples of aliphatic, cycloaliphatic or aromatic dicarboxylic acids which are suitable for building up the polyester-carbonates (B2) according to the present invention are:

oxalic acid, malonic acid, succinic acid, glutaric acid, adipic acid, pimelic acid, suberic acid, azelaic acid, sebacic acid, nonane dicarboxylic acid, decane dicarboxylic acid, dodecane dicarboxylic acid, octadecane dicarboxylic acid, dimethylmalonic acid, dimeric fatty acid, 1,4-cyclohexanedicarboxylic acid, tetrahydroterephthalic acid, tetrahydroisophthalic acid, tetrehydrophthalic acid, 3,6-endomethylenetetra-hydrophthalic acid, o-, m-, p-phenylene diacetic acid, orthophthalic acid, terephthalic acid, isophthalic acid, t-butylisophthalic acid, 3,3'-diphenyl dicarboxylic acid, 4,4'diphenyl carboxylic acid, 4,4'-benzophenone dicarboxylic acid, 3,4'- benzophenone dicarboxylic acid, 4,4'diphenylsulphone-dicarboxylic acid, 2,2bis-(4-carboxyphenyl)-propane and trimethyl-3-phenylindane-4,5-dicarboxylic acid.

The polyester-carbonates (B2) according to the present invention are preferably prepared from aromatic dicarboxylic acids. Of the aromatic dicarboxylic acids, terephthalic acid and/or isophthalic acid are particularly preferably employed. Terephthalic acid is especially preferred.

The polyester-carbonates according to the present invention may be prepared by processes such as are known from the literature for polyester-carbonate preparation, thus, e.g. by processes in homogenous solution, by melt transesterification processes and by the two-phase interface process. Preferably, melt transesterification processes and in particular the two-phase interface process is used [see DOS 1,420,475, U.S. Pat. Nos. 3,169,121, 4,156,069 and the monograph Polymer Reviews, volume 10, Condensation Polymers by Interfacial and Solution Methods, Paul W. Morgan, Interscience Publishers New York 1965, chap. VIII, p. 325 et sea., Polyester, and EP 68 014, 88 322, 134 898, 151 750, 182 189, 219 708 and 272 426 and DOS 3,903,103; 2,940,024; 3,007,934 and 3,440 020].

The polyester-carbonates (B2) according to the present invention in general have average molecular weights Mw of at least 10,000, preferably from 10,000 to 250,000 and in particular from 15,000 to 80,000.

The polycarbonates (B1) and polyester-carbonates (B2) may be mixed with one another in any desired ratio. The most favourable ratios may easily be determined by preliminary experiments and depend on the particular intended use.

The elastomers to be employed as component (C) are or contain polymers which have a glass transition temperature below 0° C., preferably below −10° C. and in particular from −15° C. to −140° C.

Examples of the elastomers which may be employed as component (C) are the most diverse rubbers, such as ethylene-propylene rubber, polyisoprene, polychloroprene, polysiloxanes, atactic polypropylene, diene, olefin and acrylate rubbers, as well as natural rubbers, styrene-butadiene block copolymers, copolymers of ethylene with vinyl acetate or with (meth)-acrylic acid esters, elastic polyurethanes and elastic polycarbonate-polyether and polyester-polyether block copolymers.

Elastomers which are preferably employed are copolymers, in particular graft copolymers (graft rubbers), having rubber-elastic properties, which are essentially obtainable from at least two of the following monomers: chloroprene, butadiene, isoprene, isobutene, styrene, acrylonitrile, ethylene, propylene, vinyl acetate and (meth)-acrylic acid esters having from 1 to 18 carbon atoms in the alcohol component, that is to say polymers such as are described, e.g., in "Methoden der Organischen Chemie", Houben-Weyl, volume 14/1, Georg Thieme Verlag, Stuttgart 1961, pages 393 to 406 and in C. B. Bucknall, "Toughened Plastics", Appl. Science Publishers, London, 1977. The preferred polymers have a gel content of more than 20, preferably more than 40, wt. %.

Examples which may be mentioned are ethylene/vinyl acetate copolymers having from 15 to 45 wt. % of vinyl acetate units and melt indices from non-flowing to 1,000, preferably from 0.1 to 20, measured under a loading of 2.16 kp and 190° C. in accordance with DIN 53 735.

The so-called EPM and EPDM rubbers in which the weight ratio of ethylene radicals to propylene radicals is from 40:60 to 90:10, preferably from 40:60 to 65:35, are also to be mentioned.

The Mooney viscosities ($ML_{1+4}/100°$ C.) of the non-crosslinked EPM or EPDM rubbers are from 25 to 100, preferably from 35 to 90. The gel contents of the non-crosslinked EPM or EPDM rubbers are less than 1 wt. %.

The ethylene/propylene copolymers (EPM) used contain virtually no double bonds, which the ethylene/propylene/diene terpolymers (EPDM) may contain from 1 to 20 double bonds/1,000 carbon atoms. Examples of suitable diene monomers in the EPDM which may be mentioned are: conjugated dienes, e.g., isoprene and butadiene, and non-conjugated dienes having from 5 to 25 carbon atoms, e.g. 1,4-pentadiene, 1,4-hexadiene, 1,5-hexadiene, 2,5-dimethyl-1,5-hexadiene and 1,4-octadiene; cyclic dienes, e.g. cyclopentadiene, cyclohexadiene, cyclooctadiene and dicyclopentadiene; alkenylnorbornenes, e.g. 5-ethylidene-2-norbornene, 5-butylidine-2-norbornene, 2-methallyl-5-norbornene and 2-isopropenyl-5-norbornene, and tricyclodienes, e.g. 3-methyl-tricyclo-$(5,2,1,0^{2,6})$-3,8-decadiene. The non-conjugated dienes hexa-1,5-diene, ethylidene-norbornene and dicyclopentadiene may be mentioned as preferred. The diene content in the EPDM is preferably from 0.5 to 10 wt. %.

Such EPM and EPDM rubbers are described e.g. in DE-OS 28 08 709.

Selectively hydrogenated block copolymers of a vinylaromatic monomer (X) and a conjugated diene (Y) of the X-Y type are moreover suitable as elastomers (C). These block copolymers may be prepared by known processes.

The technique used for the preparation of styrene-diene block copolymers, which is described in "Encyclopaedia of Polymer Science and Technology", vol. 15, Interscience, N.Y. (1971) on pages 508 et seq., may in general be used for the preparation of the suitable X-Y block copolymers of, e.g., styrene, α-methylstyrene and/or vinyltoluene and of conjugated dienes, such as butadiene and/or isoprene. The selective hydrogenation may be carried out by known routes and means that the ethylenic double bonds are essentially hydrogenated completely, the aromatic double bonds essentially remaining unaffected.

Such selectively hydrogenated block copolymers are described, e.g., in DE-OS 30 00 282.

Polybutadienes grafted with styrene and/or acrylonitrile and/or alkyl (meth)-acrylates, butadiene/styrene copolymers and poly(meth)acrylic acid esters, e.g. copolymers of styrene or alkylstyrene and conjugated dienes (roughened polystyrene), i.e. copolymers of the type described in DE-OS 16 94 173 (=U.S. Pat. No. 3,564,077), polybutadienes grafted with acrylic or methacrylic acid esters, vinyl acetate, acrylonitrile, styrene and/or alkylstyrenes, butadiene/styrene or butadiene/acrylonitrile copolymers, polyisobutenes or polyisopresenes, such as are described e.g. in DE-OS 23 48 377 (=U.S. Pat. No. 3,919,353) or in DE-3,105,364 and DE-3,019,233, are likewise suitable.

Particularly preferred elastomers are ABS polymers (both copolymeric and grafted types), such as are described, e.g., in DE-OS 20 35 390 (=U.S. Pat. No. 3,644,574) or in DE-OS 22 48 242 (=GB-PS 1,409 275).

In addition, elastomers which are obtainable by a grafting reaction of:
(I) from 10 to 40, preferably from 10 to 35, more preferably from 15 to 25, wt. %, based on the grafted product, of at least one (meth)-acrylic acid ester and/or a mixture comprising:
from 10 to 35, preferably from 20 to 35, wt. %, based on the mixture, of acrylonitrile and
from 65 to 90, preferably from 65 to 80, wt. %, based on the mixture, of styrene; on
(II) from 60 to 90, preferably from 65 to 90, more preferably from 75 to 85, wt. %, based on the grafted product, of a butadiene polymer having at least 70 wt. %, based on (II), of butadienes radicals as the grafting base;
where, preferably, the gel content of the grafting base (II) is $\geq 70\%$ (measured in toluene), the degree of grafting G is from 0.15 to 0.55 and the average particle diameter $d_{50}$ of the graft polymer (C) is from 0.2 to 0.6, preferably from 0.3 to 0.5 μm (c.f. e.g. DE 3,324,398 and EP 56 243), are particularly preferably employed.

Particularly preferred elastomers are also graft polymers comprising:
(a) from 25 to 98 wt. %, based on the grafting product, of acrylate rubber having a glass transition temperature below −20° C. as the grafting base; and
(b) from 2 to 75 wt. %, based on the grafting product, of at least one polymerizable ethylenically unsaturated monomer, of which the homo- or co-polymers formed in the absence of (a) would have a glass transition temperature above 25° C., as the grafted monomer (c.f. e.g. EP 50 265).

The graft rubbers mentioned may also be prepared by specialized methods (e.g. redox grafting (DE-OS 3,708,913)).

In addition to the above-mentioned elastomers, elastic polyurethanes (e.g. Texin ®), elastic polyester-polyether block copolymers (e.g. Hytrel ®) and elastic polycarbonate-polyether block copolymers may also be employed. These elastomers are known and are described, for example, in H. G. Elias, Makromoleküle, Hüthig u. Wepf Verlag Basle, 4th edition 1981, p. 787, and A. Noshay and I. E. McGrath, Block Copolymers, Academic Press New York, 1977, p. 341.

Graft silicon rubbers such as are described, for example, in DE 3,629,763 are also suitable as the elastomers to be employed.

The 3-component mixtures according to the present invention may be prepared in the customary manner by initially taking one or two components of the mixtures and mixing the other component(s) with the component(s) initially taken. However, it is also possible for all three components to be mixed simultaneously. The components may be mixed on kneaders, mills or single- or multi-screw extruders.

If appropriate, customary additives, e.g. lubricants and mould release agents, nucleating agents, plasticizers, stabilisers, flame-resistant additives, fillers and reinforcing substances and/or dyestuffs, may also be added to the mixtures according to the present invention.

The customary amounts of these additives may either be mixed with components (A) and/or (B) before preparation of the mixtures according to the present invention or subsequently incorporated into the mixtures according to the present invention. The amount of additives here is chosen so that the additives may display the desired action in the mixture. It may easily be determined by preliminary experiments.

The mixtures according to the present invention may be processed in the customary manner for production of shaped articles.

The shaped articles produced therefrom are used in the automobile sector (bumpers, vehicle body components and components added onto vehicle bodies) and are distinguished by a good low temperature strength and heat distortion point and a favourable processing window.

EXAMPLES

Substances Employed (Components)

(A1) The polybutylene terephthalate employed had an intrinsic viscosity of 1.25 dl/g, measured in o-dichlorobenzene/phenol (1:1) at 25° C.

(B) The homopolycarbonate based on bisphenol A employed (BPA-PC) (B1.1) had a relative viscosity of 1.28, measured in $CH_2Cl_2$ at 25° C. and a concentration of 0.5 g/ml; the homopolycarbonate based on 1,1-bis-(4-hydroxyphenyl)-3,3 5-trimethylcyclohexane employed (B1.2) had a relative viscosity of 1.301 under the same conditions.

The copolycarbonates based on bisphenol A and 1,1-bis-(4-hydroxyphenyl)-3,3,5-trimethylcyclohexane employed had the following viscosities, measured in $CH_2Cl_2$ at 25° C. and a concentration of 0.5 g/ml:

| X: Type | Mol % X | 1,1-bis-(4-hydroxyphenyl)-3,3,5-trimethylcyclohexane Relative viscosity |
|---|---|---|
| B1.3 | 20 | 1.291 |
| B1.4 | 35 | 1.300 |
| B1.5 | 40 | 1.300 |
| B1.6 | 55 | 1.300 |

TABLE 1-continued

| Example no. | A1 | B1.3 | B1.4 | B1.5 | B1.6 | B1.2 | B1.1 | C |
|---|---|---|---|---|---|---|---|---|
| 4 | 38 | — | — | — | 40 | — | — | 20 |
| 5 | 36 | 53 | — | — | — | — | — | 10 |
| 6 | 36 | — | 53 | — | — | — | — | 10 |
| 7 | 36 | — | — | — | 53 | — | — | 10 |
| 8 (comparison) | 58 | — | — | — | — | 20 | 20 | |

TABLE 2

| Example no. | Flexural E modulus [MPA] | $a_k$ [kJ/m²] | | | | | Vicat B [°C.] | Shear modulus G' at 150° C. [MPA] |
|---|---|---|---|---|---|---|---|---|
| | | RT | ±0° C. | −10° C. | −20° C. | −30° C. | | |
| 1 | 1648 | 14 | 11.5 | 8.7 | 9.5 | 8.0 | 142 | — |
| 2 | 1500 | 72.7 | — | — | 68.0 | 59.7 | 127 | 38 |
| 3 | 1665 | 68.2 | — | — | 56.8 | 32.1 | 131 | 50 |
| 4 | 1700 | 48.1 | — | — | 31.0 | 30.6 | 138 | — |
| 5 | — | 60.4 | — | — | — | 50.7 | 132 | — |
| 6 | — | 53.1 | 42.4 | 37.6 | — | — | 142 | — |
| 7 | — | 33.9 | 22.2 | — | — | — | 157 | — |
| 8 (comparison) | 1670 | 68 | — | — | 55 | — | 115 | 25 |

(C) An emulsion polymer of 80 parts, by weight, of crosslinked polybutadiene (gel content more than 70%, measured in toluene) and 20 parts, by weight, of grafted-on content of 18 parts, by weight, of methyl methacrylate and 2 parts, by weight, of n-butyl acrylate, the average particle diameter of the grafting base in latex form being from 0.3 to 0.4 #m (c.f. the information in DE-3,105,364 and DE-3,019,233).

(D) In all the experiments, nucleating agents (microtalc MVR), mould release agents (PE wax 520, Hoechst) and stabilizers ((1-methylethylidene)-di-4,1-phenylidene-tetrakis(3-ethyl-(3-oxetanyl)-methyl) phosphonate, CA: (53 184-75-1); or 4,8-dicyclohexyl-6-hydroxy-2,10-dimethyl-12H-dibenzo (d,g) (1,3,2) dioxaphosphocine, CA: (73 912-21-7) were added as customary additives in the customary amounts.

Preparation and Testing of the Moulding Compositions

The polyalkylene terephthalate (A) and the polycarbonate (B) were melted on a continuously operating twin-screw extruder, the rubber (C) was metered into the melt and the components were homogenized in the melt. The barrel temperature were chosen so that material temperatures of 260°–300° C. were maintained. The molten strand was led off into water, granulated and dried.

80×10×4 mm test bars were produced from the moulding compositions on a conventional injection moulding machine. the flexural E modulus (DIN 53 457), heat distortion point (Vicat B) (DIN 53 460) and the impact strength or notched impact strength according to Izod (ISO 180) at various temperatures, and from this the brittle/tough transition, were tested. The shear modulus was measured above room temperature using a torsion pendulum from Brabender, type 80 2 301. The samples were brought to the stated temperature at a rate of heating up of 1 K/min, and the samples were subjected to a tensile load of 10 p throughout the entire measurement time. The torque was 1,570 g/cm².

TABLE 1

| Example no. | A1 | B1.3 | B1.4 | B1.5 | B1.6 | B1.2 | B1.1 | C |
|---|---|---|---|---|---|---|---|---|
| 1 | 73 | — | — | — | — | 5 | — | 20 |
| 2 | 68 | — | — | — | 10 | — | — | 20 |
| 3 | 58 | — | — | — | 20 | — | — | 20 |

As may been seen from the tables (comparison between examples, in particular Example 3 with comparison Example 8), the mixtures according to the present invention are distinguished by a more favourable low temperature strength-heat distortion point relationship.

We claim:

1. A molding composition comprising
   (A) from 20 to 80 wt. % of a polyalkylene terephthalate;
   (B) from 1 to 50 wt. % of a thermoplastic aromatic polycarbonate and/or polyester-carbonate based on a mixture of aromatic diphenols containing
      (1) from 20 to 100 mole percent, based on the total of diphenols (B)(1) and (B)(2), of 1,1-bis(4-hydroxyphenyl)-3,3,5-trimethylcyclohexane corresponding to the formula

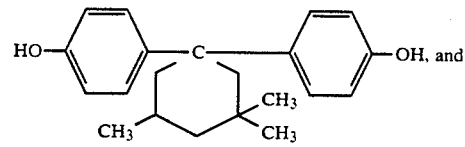

(2) 0 to 80 mole percent, based on the total of diphenols (B)(1) and (B)(2), of 2,2-bis(4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, or 1,1-bis(4-hydroxyphenyl)cyclohexane; and
   (C) from 1 to 30 wt. % of an elastomer, wherein said elastomer is a grafted polymer having an average particle diameter $d_{50}$ of from 0.2 to 0.6 obtained by grafting
      (1) from 10 to 40 wt. %, based on the grafted polymer, of
         (i) at least one (meth)acrylic acid ester and/or
         (ii) a mixture comprising from 10 to 35 wt. %, based on the mixture, of acrylonitrile and from 65 to 90 wt. %, based on the mixture, of styrene,
      onto
      (2) from 60 to 90 wt. %, based on the grafted polymer, of a butadiene polymer having at least 70 wt. %, based on the butadiene polymer, of butadiene radicals as the grafting base, wherein the gel content of the grafting base is at least 70% (as measured in toluene) and the degree of grafting G is from 0.15 to 0.5 μm,
with the proviso that components (A) to (C) total 100 wt. %, based on the total amount of components (A) to (C).

2. The composition according to claim 1 additionally comprising lubricants and mold release agents, nucleating agents, plasticizers, stabilizers, flame-resistant additives, fillers and reinforcing substances and/or dyestuffs.

3. A molded article comprising the composition of claim 1.

* * * * *

UNITED STATES PATENT AND TRADEMARK OFFICE
CERTIFICATE OF CORRECTION

PATENT NO.    : 5,310,793
DATED         : May 10, 1994
INVENTOR(S)   : Dieter Freitag et al Page 1 of 2

It is certified that error appears in the above-indentified patent and that said Letters Patent is hereby corrected as shown below:

At column 1, line 40, delete formula (I) and insert the following formula:

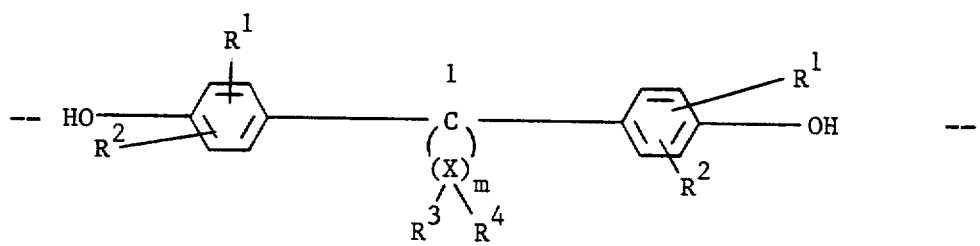

Column 2, line 23, delete "sebacib, acid" and insert --sebacic acid,--.

At column 2, line 39, delete "24 07 76" and insert --24 07 776--.

At column 3, line 50, delete formula (VI) and insert the following formula:

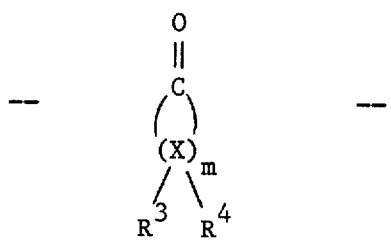

At column 5, lines 61-62, delete "et sea.," and insert --et seq.,--.

UNITED STATES PATENT AND TRADEMARK OFFICE
CERTIFICATE OF CORRECTION

PATENT NO. : 5,310,793
DATED : May 10, 1994
INVENTOR(S) : Dieter Freitag et al

It is certified that error appears in the above-identified patent and that said Letters Patent is hereby corrected as shown below:

At column 8, line 14, delete "I.E. McGrath" and insert --J. E. McGrath,--.

At column 9, line 29, delete "$\#$m" and insert --µm--.

IN THE CLAIMS:

At column 11, line 3, delete "0.5 µm" and insert --0.55 µm--.

Signed and Sealed this

Eighteenth Day of October, 1994

Attest:

BRUCE LEHMAN

Attesting Officer     Commissioner of Patents and Trademarks